United States Patent
Kang et al.

(10) Patent No.: US 11,414,064 B2
(45) Date of Patent: Aug. 16, 2022

(54) HYBRID VEHICLE AND DRIVING CONTROL METHOD FOR THE SAME

(71) Applicants: Hyundai Motor Company, Seoul (KR); Kia Motors Corporation, Seoul (KR)

(72) Inventors: Ji Hoon Kang, Seoul (KR); Jea Mun Lee, Seoul (KR); Joon Young Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 216 days.

(21) Appl. No.: 16/936,547

(22) Filed: Jul. 23, 2020

(65) Prior Publication Data

US 2021/0070278 A1    Mar. 11, 2021

(30) Foreign Application Priority Data

Sep. 6, 2019    (KR) .......... 10-2019-0110709

(51) Int. Cl.
*B60W 20/00* (2016.01)
*B60W 40/112* (2012.01)
(Continued)

(52) U.S. Cl.
CPC .......... *B60W 20/00* (2013.01); *B60W 40/112* (2013.01); *B60W 50/14* (2013.01);
(Continued)

(58) Field of Classification Search
CPC .... B60W 20/00; B60W 40/112; B60W 50/14; B60W 2555/60; B60W 2552/05;
(Continued)

(56) References Cited

U.S. PATENT DOCUMENTS 10,996,063 B2 * 5/2021 Kurihashi .......... G01C 21/3415
2017/0096134 A1 * 4/2017 Yoon .................... B60W 20/13
(Continued)

FOREIGN PATENT DOCUMENTS

| JP | 2004056867 A | * | 2/2004 | |
| JP | 2015080961 A | * | 4/2015 | ............ B60W 20/12 |

OTHER PUBLICATIONS

Wen et al., "Compilation of dynamic efficiency test cycle for motor propulsion system on hybrid electric vehicle," 2010, vol. 1, Publisher: IEEE.*
Xiaodi et al., "The charging load model of electric vehicle based on cloud model," 2016, Publisher: IEEE.*
(Continued)

*Primary Examiner* — Tuan C To
(74) *Attorney, Agent, or Firm* — Fox Rothschild LLP

(57) ABSTRACT

A driving control method of a hybrid vehicle is provided. The method includes acquiring link information on each of a current link in which the vehicle currently travels in an electric vehicle (EV) mode and a forward link connected to the current link ahead of the current link. A first average driving load of the current line and a second average driving load of the forward link are calculated based on the acquired link information. When the second average driving load is greater than the first average driving load a minimum required state of charge (SoC) based on the second average driving load and a preset driving mode switch reference are determined.

19 Claims, 4 Drawing Sheets

(51) Int. Cl.
 *B60W 50/14* (2020.01)
 *G01C 21/36* (2006.01)
(52) U.S. Cl.
 CPC ....... *G01C 21/36* (2013.01); *B60W 2050/146* (2013.01); *B60W 2510/244* (2013.01); *B60W 2520/10* (2013.01); *B60W 2552/05* (2020.02); *B60W 2552/15* (2020.02); *B60W 2555/60* (2020.02)
(58) Field of Classification Search
 CPC ..... B60W 2050/146; B60W 2510/244; B60W 2520/10; G01C 21/36
 USPC .......................................................... 701/22
 See application file for complete search history.

(56) References Cited

U.S. PATENT DOCUMENTS

| | | | | |
|---|---|---|---|---|
| 2018/0354494 | A1* | 12/2018 | Yagi | B60K 6/36 |
| 2019/0031180 | A1* | 1/2019 | Lee | B60K 6/48 |
| 2019/0039601 | A1* | 2/2019 | Hawley | B60W 10/10 |
| 2019/0126907 | A1* | 5/2019 | Park | B60W 10/08 |
| 2019/0232950 | A1* | 8/2019 | Atluri | B60W 40/04 |
| 2019/0322267 | A1* | 10/2019 | Kurihashi | B60W 50/0097 |
| 2020/0094812 | A1* | 3/2020 | Kurihashi | B60K 6/28 |

OTHER PUBLICATIONS

Mahesh et al., "Electric Vehicle Li-Ion Battery State of Charge Estimation Using Artificial Neural Network," 2018, Publisher: IEEE.*

* cited by examiner

HYBRID VEHICLE AND DRIVING CONTROL METHOD FOR THE SAME

CROSS-REFERENCE TO RELATED APPLICATION(S)

This application claims the benefit of Korean Patent Application No. 10-2019-0110709, filed on Sep. 6, 2019, which is hereby incorporated by reference as if fully set forth herein.

BACKGROUND

Field of the Disclosure

The present disclosure relates to a hybrid vehicle and a driving mode control method for the same, and more particularly, to a hybrid vehicle and a driving mode control method for the same for changing a driving mode switch reference for enhancing fuel efficiency.

Discussion of the Related Art

In general, a hybrid electric vehicle (HEV) refers to a vehicle that uses two power sources that mainly include an engine and an electric motor. An HEV has excellent fuel efficiency and engine performance compared with a vehicle including only an internal combustion engine and is also advantageous for reducing emissions and, thus, has been actively developed recently.

Such a hybrid vehicle travels in two modes according to a powertrain used to drive the vehicle. One of the modes is an electric vehicle (EV) mode in which the vehicle travels using only an electric motor and the other mode is a hybrid electric vehicle (HEV) mode in which both an electric motor and an engine are operated to acquire power. A hybrid vehicle switches between the two modes based on driving conditions.

The switch between the driving modes is generally performed to maximize fuel efficiency or driving efficiency based on the efficiency characteristics of a powertrain. However, a general hybrid vehicle travels in an EV mode when it is possible to drive the vehicle in an EV mode on a current road irrespective of whether a high-load driving period is present forward. In other words, the hybrid vehicle travels in an EV mode until a state of charge (SoC) reaches a preset minimum maintenance SoC that is a reference for switching to an HEV mode for system protection or the like even if the SoC is decreased.

Then, when the high-load driving period begins, if it is difficult to charge a battery by driving an engine, a SoC is maintained at a low level or is reduced to the minimum maintenance SoC or less. Even if it is possible to charge the battery by driving the engine, when an EV mode is forcibly switched to an HEV mode to charge the battery to ensure a predetermined SoC, fuel efficiency is degraded.

SUMMARY

Accordingly, the present disclosure provides a method of effectively changing a driving mode and a hybrid vehicle for performing the method. In particular, the present disclosure provides a method of changing a driving mode based on a driving load of a forward path and a hybrid vehicle for performing the method.

The technical problems solved by the embodiments are not limited to the above technical problems and other technical problems which are not described herein will become apparent to those skilled in the art from the following description.

In accordance with the purpose of the disclosure, as embodied and broadly described herein, a driving control method of a hybrid vehicle may include acquiring link information on each of a current link in which the vehicle currently travels in an electric vehicle (EV) mode and a forward link connected to the current link ahead of the current link, calculating a first average driving load of the current line and a second average driving load of the forward link, based on the acquired link information, when the second average driving load is greater than the first average driving load, determining a minimum required state of charge (SoC) based on the second average driving load and a preset driving mode switch reference, and determining whether the driving mode switch reference is changed based on first average driving power required to travel in the current link in the EV mode based on the first average driving load and maximum EV driving power based on a maximum SoC reduction rate for satisfying the minimum required SoC at a time point of entry into the forward link.

In another aspect of the present disclosure, a hybrid vehicle may include a navigation system configured to provide link information regarding each of a current link in which the vehicle currently travels in an electric vehicle (EV) mode and a forward link connected to the current link ahead of the current link, and a hybrid controller configured to calculate a first average driving load of the current line and a second average driving load of the forward link, based on the acquired link information Additionally, the controller may be configured to, when the second average driving load is greater than the first average driving load, determine a minimum required state of charge (SoC) based on the second average driving load and a preset driving mode switch reference, and determine whether the driving mode switch reference is changed based on first average driving power required to travel in the current link in the EV mode based on the first average driving load and maximum EV driving power depending on a maximum SoC reduction rate for satisfying the minimum required SoC at a time point of entry into the forward link.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description serve to explain the principle of the disclosure. In the drawings.

DETAILED DESCRIPTION

Figure 1:
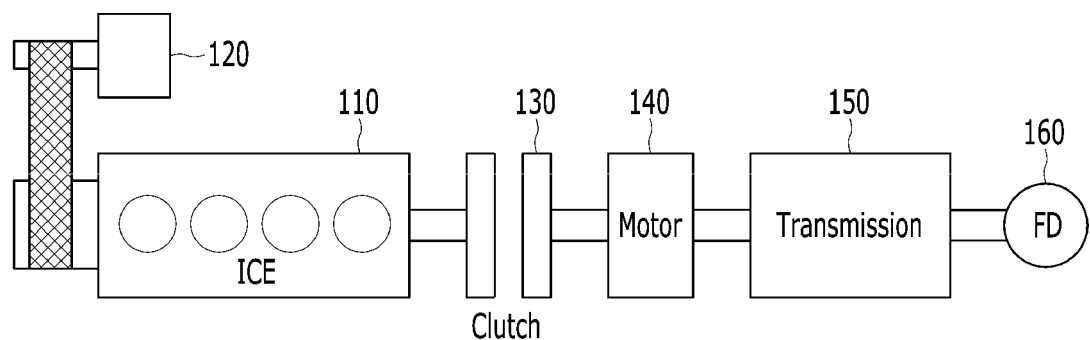
FIG. 1 is a diagram illustrating an example of a powertrain structure of a hybrid vehicle to which exemplary embodiments of the present disclosure are applicable.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the exemplary embodiments of the present disclosure will be described in detail with reference to the accompanying drawings so as to be easily implemented by those skilled in the art. However, the present disclosure may be variously implemented and is not limited to the exemplary embodiments described herein. In the drawings, to clearly describe the present disclosure, portions which are not related to the description of the present disclosure will be omitted and similar portions are denoted by similar reference numerals throughout the specification.

The present disclosure proposes that a reference for switching a driving mode be set based on a driving load and a current state of charge (SoC) of a forward driving period and a driving load of a current driving period when the driving load in the forward driving period is increased by comparing the driving load of the current driving period with the driving load of the forward driving period.

Prior to the description of a method of setting a reference for switching a driving mode according to an exemplary embodiment of the present disclosure, a structure and a control system of a hybrid vehicle applicable to exemplary embodiments will be described. First, a structure of a hybrid vehicle to which exemplary embodiments of the present disclosure are applicable will be described with reference to FIG. 1. FIG. 1 is a diagram illustrating an example of a powertrain structure of a hybrid vehicle to which exemplary embodiments of the present disclosure are applicable.

FIG. 1 illustrates a powertrain of a hybrid vehicle employing a parallel type hybrid system including an electric motor 140 (or a driving motor) and an engine clutch 130 that are installed between an internal combustion engine (ICE) 110 and a transmission 150. In such a vehicle, in general, when a driver engages an accelerator after turning on the vehicle, the motor 140 is driven using power of a battery while the engine clutch 130 is open and transmits power of the motor to move wheels through the transmission 150 and a final drive (FD) 160 (i.e., EV mode). As the vehicle gradually accelerates, high driving force is further required and, in this case, an auxiliary motor (or a starter generator motor 120) may be operated to drive the engine 110.

Accordingly, when rotational speeds of the engine 110 and the motor 140 are equal to each other, the engine clutch 130 is engaged to thus drive both the engine 110 and the motor 140 drive the vehicle (i.e., transition to an HEV mode from an EV mode). When a predetermined engine off condition such as vehicle deceleration is satisfied, the engine clutch 130 is open and the engine 110 stops (i.e., transition to an EV mode from an HEV mode). In addition, the hybrid vehicle converts driving force of a wheel into electric energy to recharge a battery, which is referred to as braking energy regeneration or regenerative brake.

The starter generator motor 120 may operate as a starter motor when the engine is turned on and may operate as a generator after the engine is turned on or when rotational energy is recovered during engine off. Accordingly, the starter generator motor 120 may also be referred to as a hybrid starter generator (HSG) and, as necessary, may be referred to as an auxiliary motor.

Figure 2:
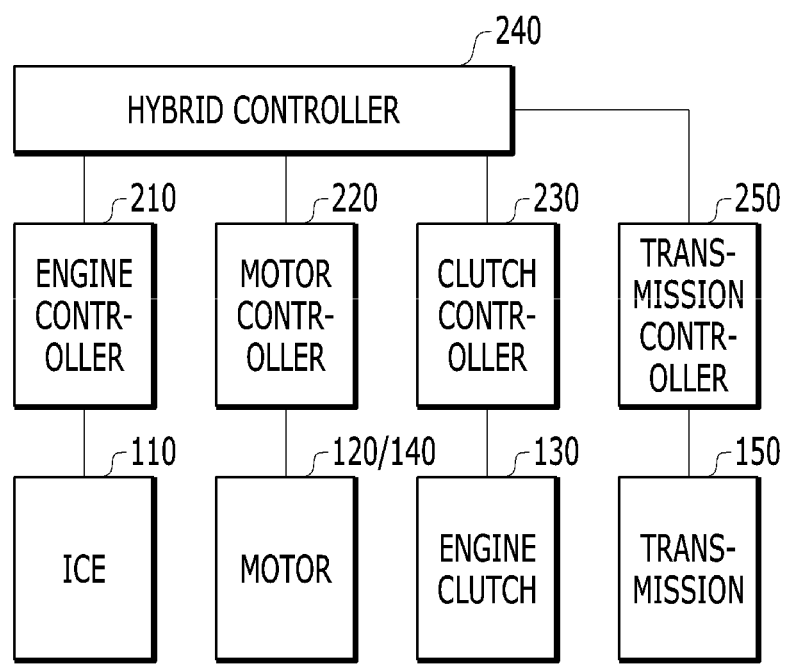
FIG. 2 is a block diagram showing an example of a control system of a hybrid vehicle to which exemplary embodiments of the present disclosure are applicable.

A relationship among controllers of a vehicle including the aforementioned powertrain is shown in FIG. 2. FIG. 2 is a block diagram showing an example of a control system of a hybrid vehicle to which exemplary embodiments of the present disclosure are applicable.

Referring to FIG. 2, in the hybrid vehicle to which exemplary embodiments of the present disclosure are applicable, the internal combustion engine 110 may be operated by an engine controller 210, torque of the starter generator motor 120 and the motor 140 may be adjusted by a motor control unit (MCU) 220, and the engine clutch 130 may be operated by a clutch controller 230. In particular, the engine controller 210 may also be referred to as an engine management system (EMS). In addition, the transmission 150 may be operated by a transmission controller 250. As necessary, the starter generator motor 120 and the motor 140 may be operated by different separate motor controllers.

Each controller may be connected to a hybrid control unit (HCU) 240 configured to execute an overall mode switching procedure as a high-level controller and may be configured to provide information required to switch driving modes and operate an engine clutch during gear shift, and/or information required to execute engine off to the HCU 240 or perform an operation according to a control signal from the HCU 240.

Particularly, the HCU 240 may be configured to determine whether modes are switched based on a driving state of a vehicle. For example, the hybrid controller may be configured to determine an open time of the engine clutch (EC) 130 and adjust hydraulic pressure (in the case of a wet EC) or torque capacity (in the case of a dry EC) when the EC is open. The HCU 240 may be configured to determine an EC state (e.g., lock-up, slip, open, etc.) and adjust a time for stop of fuel injection of the engine 110. The hybrid controller may be configured to transmit a torque command for adjusting torque of the starter generator motor 120 to the MCU 220 to turn the engine off and control engine rotational energy recovery. In addition, the HCU 240 may be configured to determine a mode switching condition during execution of driving mode switching and operate a low-level controller for mode switching.

It would be obvious to one of ordinary skill in the art that the aforementioned relationship between the controllers and functions/divisions of the controllers are exemplary and, thus, are not limited to the terms. For example, the HCU 240 may be embodied by allowing any one of other controllers except for the HCU 240 to provide a corresponding function or two or more of other controllers may distribute and provide the corresponding function.

In the following description, a driving period will be described using a concept of a link. The link may refer to a road section or a change point that is distinguished based on a speed limit, an average gradient, a road type, or the like. According to exemplary embodiments of the present disclosure, the link may be used as the road section. Thus, a change in link may be closely associated with a change in driving load. For example, a point at which a current speed limit is changed to 100 Km/h on a road with a speed limit of 80 Km/h may be considered as a link change point.

As a result, when the link is changed, this indicates that a vehicle load is changed due to a change in the characteristics of a road, and thus, according to the exemplary embodiment of the present disclosure, a driving load may be determined in units of links when a reference for switching a driving mode is set. Information related to the link, for example, the position and length of a link, a road type, a speed limit, a gradient for calculating a driving load described later in the corresponding link, or an average vehicle speed based on real-time traffic information may be acquired through a navigation system.

Then, driving required energy required to travel in an arbitrary link may be acquired using a method of multiplying an average driving load (i.e., average driving power) of the corresponding link by the length of the corresponding link. The driving required energy may be calculated by a hybrid controller based on information acquired from a navigation system.

In particular, the driving load may be acquired by summing air resistance Ra, rolling resistance Rr, and hill climbing resistance Rc. The air resistance Ra may be acquired according to "½ *Cd*ρ*A*V^2", the hill climbing resistance Rc may be acquired according to "W*sin θ", and the rolling resistance Rr may be acquired according to "μW". The variables in the mathematical expressions for the respective resistances may have the following meaning: Cd: air resistance coefficient, ρ: air density, A: front projected-area of vehicle, V: relative speed of vehicle, W: total weight of vehicle (which is assumed to be equal to or less than 1 ton), g: acceleration of gravity, θ: gradient, μ: rolling resistance coefficient A vehicle speed corresponds to a parameter, and thus, the air resistance Ra may be acquired using a method of inserting a smaller value of an average vehicle speed and a speed limit in a corresponding link into V, the hill climbing resistance Rc may be acquired using the gradient θ of the corresponding link, and the rolling resistance Rr may be acquired by inserting μ corresponding to a road type of the corresponding link.

A driving control method of a hybrid vehicle according to the present disclosure based on the link and the average driving load and driving required energy in the link that have been described thus far will be described below with reference to FIGS. 3 and 4.

Figure 3:
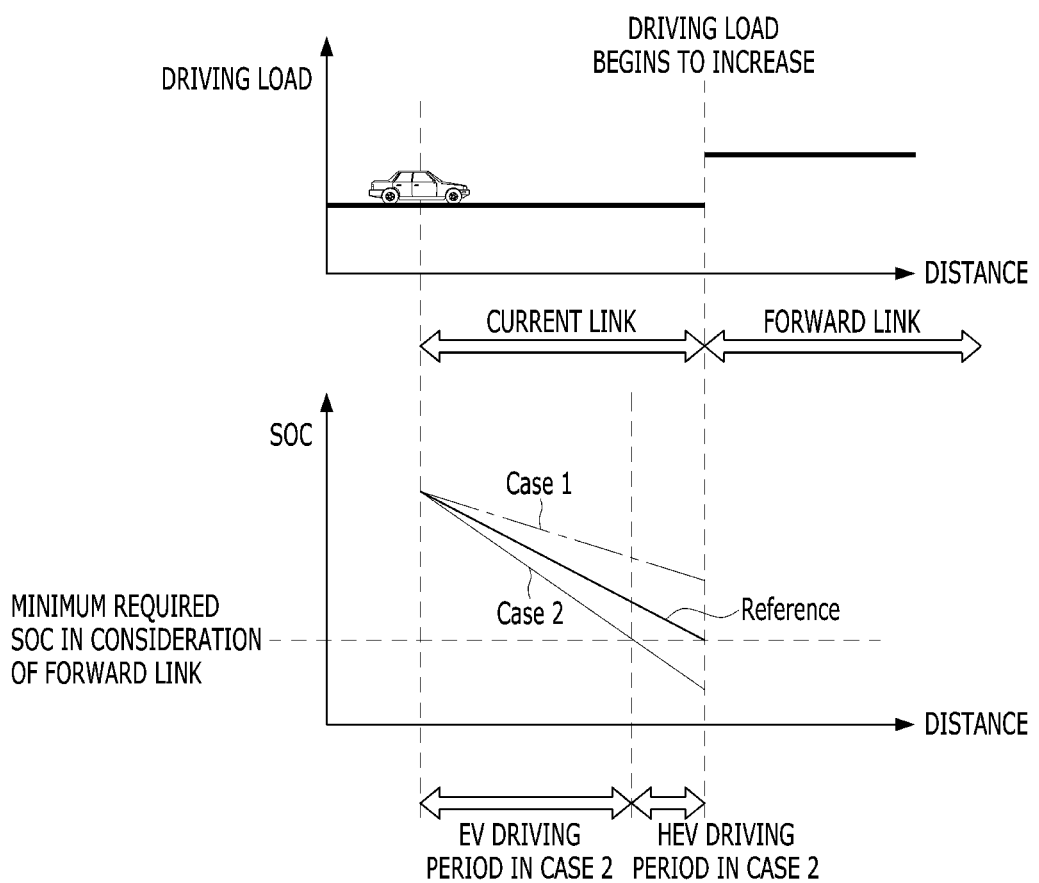
FIG. 3 is a diagram for explaining a concept of a change in a mode switch reference depending on a driving load change between a current link and a forward link according to an exemplary embodiment of the present disclosure.

FIG. 3 is a diagram for explaining a concept of a change in a mode switch reference based on a driving load change between a current link and a forward link according to an exemplary embodiment of the present disclosure. FIG. 4 is a flowchart showing an example of an operation of changing a mode switch reference according to an exemplary embodiment of the present disclosure.

Particularly, FIG. 3 show two graphs. A vertical axis in the lower graph indicates a driving load, a vertical axis in the lower graph indicates a battery SoC, and a horizontal axis is shared by the upper and lower graphs and indicates a distance. The distance may be broadly classified into a current link and a forward link, and as shown in the upper graph, a driving load is increased in the forward link compared with in the current link.

Figure 4:
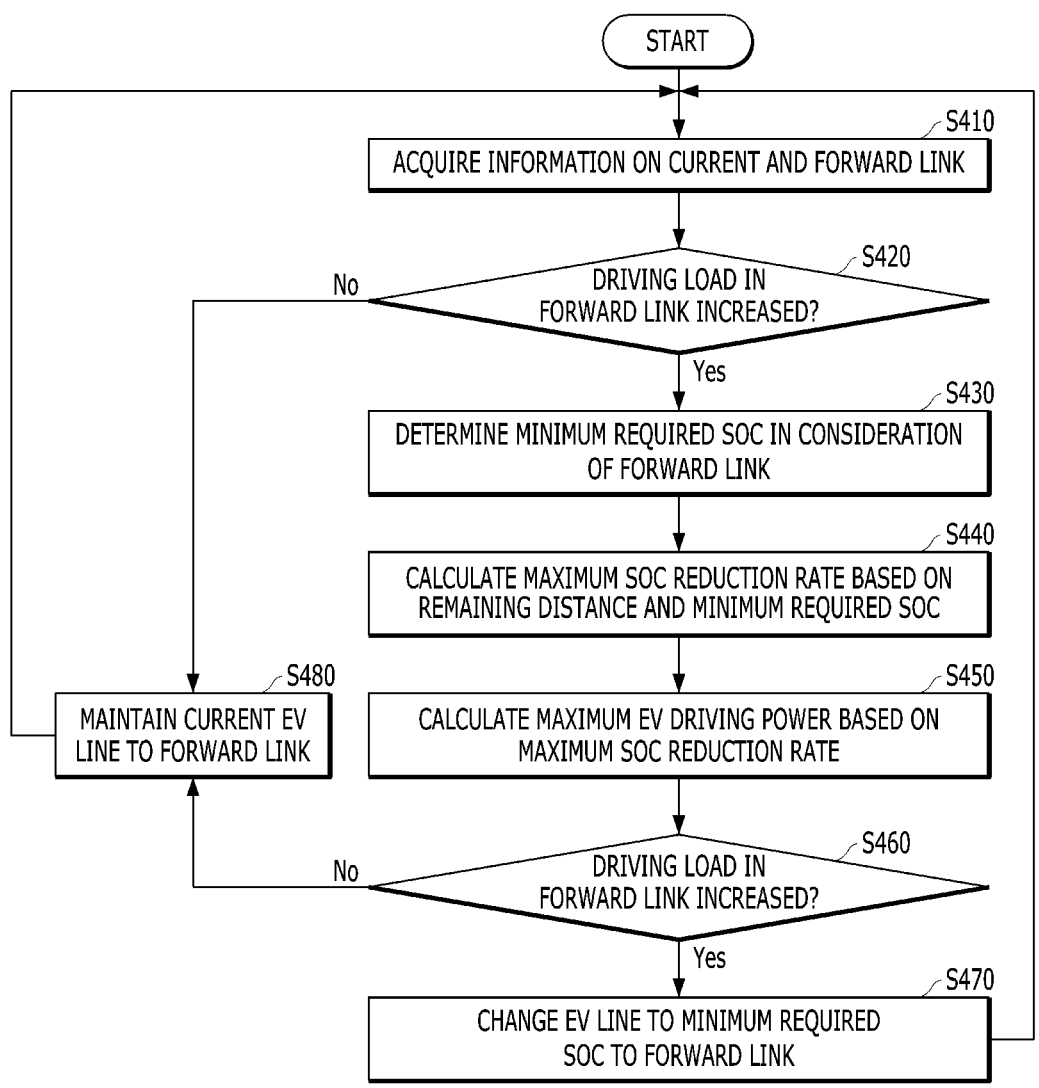
FIG. 4 is a flowchart showing an example of an operation of changing a mode switch reference according to an exemplary embodiment of the present disclosure.

In FIG. 4, as driving begins, a hybrid controller may be configured to acquire information regarding the current link and the forward link (S410). In particular, the acquired information may be transferred to a navigation system, and as described above, may include information required to calculate an average driving load for each link and energy required for driving for each link, such as the position and length of a link, a road type, an average gradient, or an average vehicle speed based on real-time traffic information.

The HCU 240 may be configured to calculate respective average driving loads of the current link and the forward link based on the acquired information and compare the average driving loads with each other (S420). As shown in the upper graph of FIG. 3, when the driving load of the forward link is increased (YES of S420), the HCU 240 may be configured to determine a minimum required SoC that is a SoC that needs to be ensured or left until a vehicle enters the forward link (S430).

The minimum required SoC may be a SoC for smoothly managing a SoC while a vehicle travels in a forward link, and may refer to a value obtained by summing a transition reference (hereinafter, referred to as an "EV line") into an HEV mode from a preset EV mode and a predicted consumption SoC that is predicted to be consumed when the vehicle travels in the forward link (e.g., SoC corresponding to EV line+predicted consumption SoC in forward link section).

The predicted consumption SoC in the forward link section may be a value obtained by multiplying average driving power based on an average driving load of the forward link by the length of the forward link, but the present disclosure is not limited thereto. For example, the predicted consumption SoC in the forward link section may also be a value obtained by considering SoC maintenance or charge based on partial HEV mode switch based on a driving load of the forward link as well as average driving power while the vehicle travels in an EV mode.

When the minimum required SoC is determined, the HCU 240 may be configured to calculate a maximum SoC reduction rate based on the current SoC and the minimum required SoC (S440). The maximum SoC reduction rate may refer to a gradient of a difference between the current SoC and the minimum required SoC with respect to the remaining distance of the current link, as shown in the lower graph of FIG. 3. In other words, the maximum SoC reduction rate may refer to a maximum average SoC that is allowed to be consumed per unit distance in a current link to ensure (i.e., leave) the minimum required SoC at a time point when the vehicle reaches the forward link from a current position as a starting position.

A SoC is a method of representing battery available power converted into 0 to 100%, and when SoC consumption is known, EV driving power may be calculated. Thus, the HCU 240 may be configured to calculate maximum EV driving power of the motor 120 when a vehicle travels in an EV mode in a current link based on the maximum SoC reduction rate (S450). Thus, the hybrid controller may be configured to compare the maximum EV driving power with average driving power based on the calculated average driving load of the current link using the driving power and the link information (S460).

As the comparison result, when the average driving power of the current link is greater than the maximum EV driving power (YES of S460), this indicates that the minimum required SoC is not satisfied when a vehicle reaches the forward link, and thus, the HCU 240 may be configured to change, that is, increase an EV line up to the forward link to the minimum required SoC (S470). Accordingly, when reaching the EV line with a SoC that is changed before the reaching the forward link, a hybrid vehicle may be transitioned to an HEV mode, and thus, the SoC may be prevented from being consumed after mode transition to ensure a minimum required SoC at a time point when the vehicle reaches the forward link.

For example, in the lower graph of FIG. 3, when SoC consumption corresponding to the average driving power of the current link corresponds to Case 2, the average driving power of the current link may be greater than the maximum EV driving power. In particular, when the hybrid vehicle continues to travel in an EV mode in the current link, a SoC may be reduced to less than the minimum required SoC at a time point when the vehicle reaches the forward link. Thus, the EV line may be increased to the minimum required SoC, and thus, the EV mode may be switched to the HEV mode from a time point when the SoC reaches the minimum required SOC to maintain the minimum required SoC.

In contrast, when the average driving power of the current link is less than the maximum EV driving power (NP of S460), even if the EV mode is maintained in the current link, when the vehicle reaches the forward link, the minimum required SoC or greater may be maintained. Thus, the hybrid controller may be configured to maintain the current EV line up to the forward link (S480).

For example, in the lower graph of FIG. 3, when SoC consumption corresponding to the average driving power of the current link corresponds to Case 1, the average driving power of the current link may be less than the maximum EV driving power. Thus, even if the EV mode is maintained rather than increasing the EV line, the vehicle enters the forward link in a state in which the minimum required SoC or greater is ensured, thereby ensuring effective driving in the forward link.

Whether the EV line is adjusted based on the aforementioned driving control method may be output in the form recognizable by a driver. In particular, the hybrid vehicle according to an exemplary embodiment may include a display device such as a display of a cluster, a head unit, or an audio/video/navigation (AVN) system or a head-up display (HUD). When the display device acquires information regarding whether the EV line is changed based on a driving difference between the current link and the forward line and an SoC from the hybrid controller, the corresponding information may be displayed on the display device, which will be described with reference to FIG. 5. Notably, the display device may be operated by the HCU.

Figure 5:
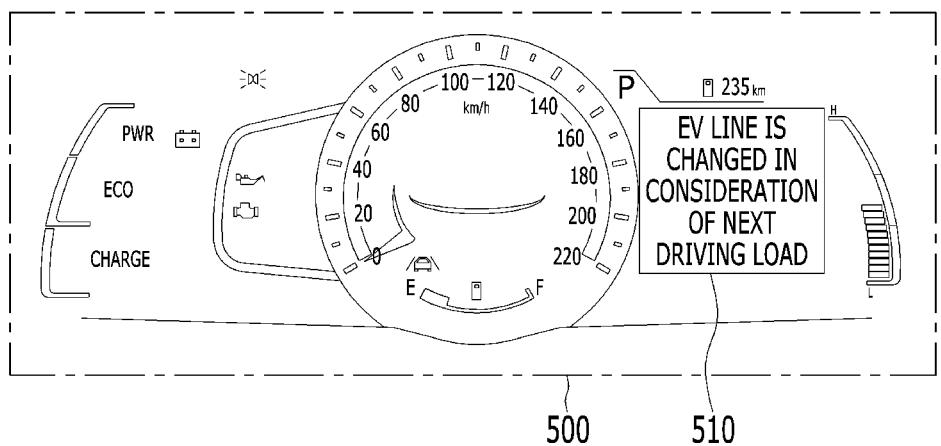
FIG. 5 is a diagram showing an example of a form of outputting information indicating that a mode switch reference is changed according to an exemplary embodiment of the present disclosure.

FIG. 5 is a diagram showing an example of a form of outputting information indicating that a mode switch reference is changed according to an exemplary embodiment of the present disclosure. Referring to FIG. 5, a hybrid vehicle according to an exemplary embodiment may be configured to output information regarding whether the EV line is changed in one region 510 of a cluster 500, which allows an arbitrary text to be displayed, in the form of a text.

The display form is exemplary, and the text may be replaced with a warning light that blinks at a fixed position or may be displayed in the form of an icon, and may be modified in various forms, for example, the changed EV line may be displayed on a battery gauge. The displayed position as well as the display form may be changed to another position of a cluster or a display of an AVN system or a head unit, a head-up display, or the like.

A hybrid vehicle related to at least one exemplary embodiment of the present disclosure as configured above may more effectively change a driving mode. In particular, a reference for switching a driving mode may be changed based on a driving load of a forward driving path, and thus, a sufficient charge state may be ensured prior to entry into a driving path with a high driving load.

It will be appreciated by persons skilled in the art that that the effects that could be achieved with the present disclosure are not limited to what has been particularly described hereinabove and other advantages of the present disclosure will be more clearly understood from the detailed description.

The disclosure may also be embodied as computer readable code on a non-transitory computer readable recording medium. The non-transitory computer readable recording medium is any data storage device configured to store data which may thereafter be read by a computer system. Examples of the non-transitory computer readable recording medium include read-only memory (ROM), random-access memory (RAM), CD-ROMs, magnetic tapes, floppy disks, and optical data storage devices.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A driving control method of a hybrid vehicle, comprising:
   acquiring, by a controller, link information on each of a current link in which the vehicle currently travels in an electric vehicle (EV) mode and a forward link connected to the current link ahead of the current link;
   calculating, by the controller, a first average driving load of the current line and a second average driving load of the forward link, based on the acquired link information;
   in response to determining that the second average driving load is greater than the first average driving load, determining, by the controller, a minimum required state of charge (SoC) based on the second average driving load and a preset driving mode switch reference; and
   determining, by the controller, whether to change the driving mode switch reference based on first average driving power required to travel in the current link in the EV mode based on the first average driving load and maximum EV driving power based on a maximum SoC reduction rate to satisfy the minimum required SoC at a time point of entry into the forward link.

2. The method of claim 1, wherein the determining whether the driving mode switch reference is changed includes changing the driving mode switch reference to the minimum required SoC in response to determining that the first average driving power is greater than the maximum EV driving power.

3. The method of claim 1, wherein the determining whether the driving mode switch reference is changed includes maintaining the driving mode switch reference in response to determining that the first average driving power is less than the maximum EV driving power.

4. The method of claim 1, wherein the determining the minimum required SoC includes:
   determining, by the controller, the minimum required SoC by adding the driving mode switch reference to a value obtained by multiplying second average driving power required to travel in the forward link in the EV mode based on the second average driving load by a length of the forward link.

5. The method of claim 1, wherein the link information includes at least one of a length for each link, a road type, a speed limit, an average gradient, or an average vehicle speed based on real-time traffic information.

6. The method of claim 5, wherein the calculating of the first average driving load of the current line and the second average driving load of the forward link includes:
   calculating, by the controller, a rolling resistance load based on the road type;
   calculating, by the controller, a gradient load based on the average gradient;
   calculating, by the controller, an air resistance load based on the speed limit or the average vehicle speed; and
   summing, by the controller, the rolling resistance load, the gradient load, and the air resistance load.

7. The method of claim 1, wherein the maximum SoC reduction rate is calculated based on a difference between a current SOC and the minimum required SoC and a remaining distance to a start point of the forward link from a current position.

8. The method of claim 1, further comprising outputting a result of determination of whether to change the driving mode switch reference through a display device.

9. The method of claim 1, wherein the determining of the whether to change the driving mode switch reference is repeated until the vehicle reaches the forward link.

10. A non-statutory computer readable recording medium having recorded thereon a program for executing the driving control method of the hybrid vehicle of claim 1.

11. A hybrid vehicle, comprising:
    a navigation system configured to provide link information regarding each of a current link in which the vehicle currently travels in an electric vehicle (EV) mode and a forward link connected to the current link ahead of the current link; and
    a hybrid controller configured to:
      calculate a first average driving load of the current line and a second average driving load of the forward link, based on the acquired link information;
      in response to determining that the second average driving load is greater than the first average driving load, determine a minimum required state of charge (SoC) based on the second average driving load and a preset driving mode switch reference; and
      determine whether to change the driving mode switch reference based on first average driving power required to travel in the current link in the EV mode based on the first average driving load and maximum EV driving power based on a maximum SoC reduction rate to satisfy the minimum required SoC at a time point of entry into the forward link.

12. The hybrid vehicle of claim 11, wherein the hybrid controller is configured to change the driving mode switch reference to the minimum required SoC in response to determining that the first average driving power is greater than the maximum EV driving power.

13. The hybrid vehicle of claim 11, wherein the hybrid controller is configured to maintain the driving mode switch reference in response to determining that the first average driving power is less than the maximum EV driving power.

14. The hybrid vehicle of claim 11, wherein the hybrid controller is configured to determine the minimum required SoC by adding the driving mode switch reference to a value obtained by multiplying second average driving power required to travel in the forward link in the EV mode based on the second average driving load by a length of the forward link.

15. The hybrid vehicle of claim 11, wherein the link information includes at least one of a length for each link, a road type, a speed limit, an average gradient, or an average vehicle speed based on real-time traffic information.

16. The hybrid vehicle of claim 15, wherein the hybrid controller is configured determine the first average driving load and the second average driving load by calculating a rolling resistance load based on the road type, calculating a gradient load based on the average gradient, calculating an air resistance load based on the speed limit or the average vehicle speed, and summing the rolling resistance load, the gradient load, and the air resistance load.

17. The hybrid vehicle of claim 11, wherein the maximum SoC reduction rate is calculated based on a difference between a current SOC and the minimum required SoC and a remaining distance to a start point of the forward link from a current position.

18. The hybrid vehicle of claim 11, further comprising:
    a display device configured to output a result of determination of whether to change the driving mode switch reference.

19. The hybrid vehicle of claim 11, wherein determination of the whether to change the driving mode switch reference is repeated until the vehicle reaches the forward link.

* * * * *